Sept. 20, 1971     F. G. J. GRISE     3,606,576

DRIVE FOR A PORTABLE MIXING APPLIANCE

Filed Dec. 5, 1969

Inventor
Frederick G. J. Grise
By Charles R. Fay,
Attorney

United States Patent Office 3,606,576
Patented Sept. 20, 1971

3,606,576
DRIVE FOR A PORTABLE MIXING APPLIANCE
Frederick G. J. Grisé, Ware Point Road,
West Brookfield, Mass. 01585
Filed Dec. 5, 1969, Ser. No. 882,674
Int. Cl. B01f 7/00
U.S. Cl. 416—170
6 Claims

ABSTRACT OF THE DISCLOSURE

A single beating element for operation by an electric motor having a pair of rotary driving members, including a shaft to be clutched to one of said driving members and a rod for non-clutching engagement with the other of said driving members.

BACKGROUND OF THE INVENTION

Reference is hereby made to U.S. Pat. #3,076,638 dated Feb. 5, 1963 for a portable culinary electric mixing and beating appliance which includes a self-contained driving member for the beating member, the latter having in combination therewith a fixed position juxtaposed element in the general shape of a spoon having the construction and advantages disclosed in said patent. However it has been found that it is desirable at times to also provide a separable beating element and juxtaposed spoon-like element for driving by means of a separate motor, e.g., the conventional electric culinary mixing apparatus which in most cases includes a pair of parallel driving members for the purpose of driving a pair of inter-related beating members. In the present case only one beating member is needed, and if not anchored, would tend to rotate as a unit as well as rotating the beating member.

SUMMARY OF THE INVENTION

A device comprising a frame, a shaft therein, a beating element on the shaft, a spoon-like juxtaposed element associated therewith, said frame including a support for a plain rotary rod or shaft whereby the shaft for the beating element may be clutched to one of the two driving elements of a conventional culinary motor and the plain rod thrust into the clutch of the other driving member without however being engaged with respect thereto, thereby holding the entire device against any rotary motion aside from the driving of the beating element per se.

PREFERRED EMBODIMENT OF THE INVENTION

Figure 1:
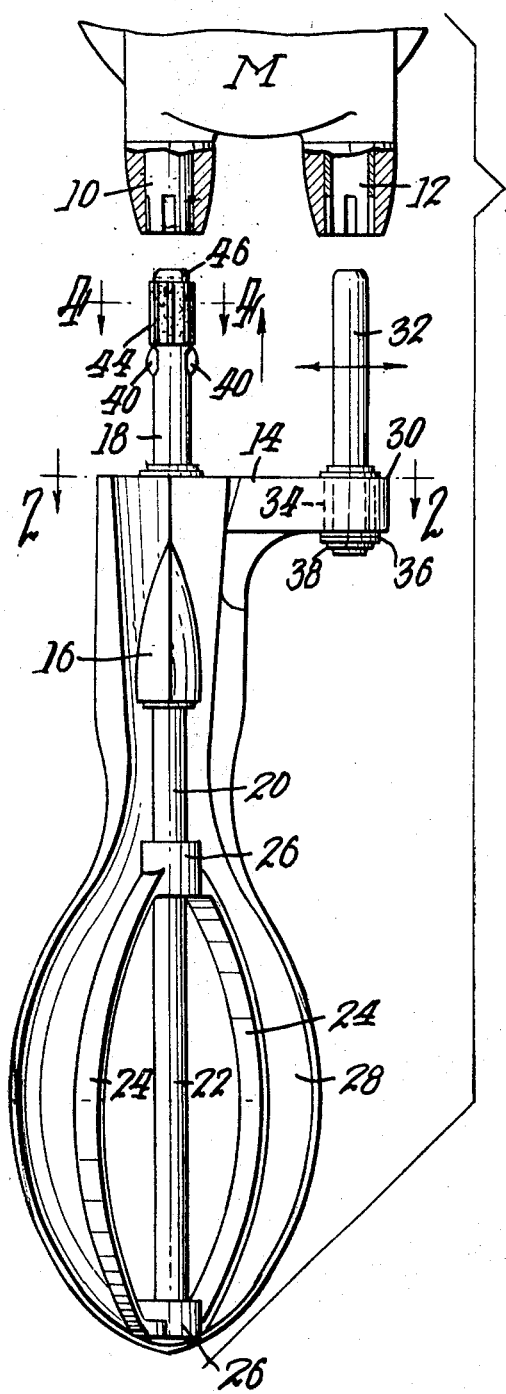
FIG. 1 is an exploded view illustrating the invention.
Figure 2:
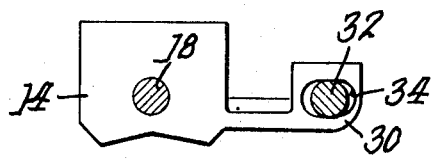
FIG. 2 is a section on line 2—2 of FIG. 1.
Figure 3:
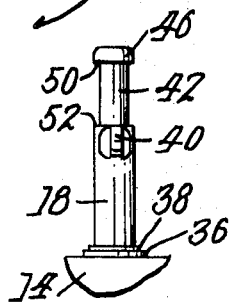
FIG. 3 is a detail view of the drive shaft for the beating element with its driver or clutching member removed.
Figure 4:
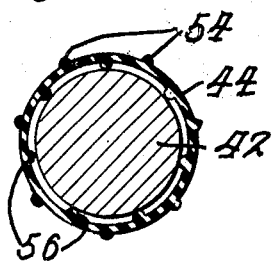
FIG. 4 is an enlarged section on line 4—4 of FIG. 1.

As shown in FIG. 1 the reference character M indicates an electric motor of well known design having a pair of driving members or clutches 10 and 12 as is conventional for culinary beaters. These are found in general use in the kitchen for the purpose of clutching to a pair of shafts for an interconnected beating arrangement such as is well known as for instance in egg beaters.

A support 14 made of any suitable material, e.g., metal or plastic, is provided with a portion thereof at 16 forming a bearing for a drive shaft 18. This drive shaft extends as at 20 to drive shaft portion 22 to which are secured a pair of e.g., resilient flexible plastic beater members 24, 24. The beater members 24, 24 are held at their ends as by collars or the like 26, 26 so that they are held in bowed shape as shown.

The surface of revolution of these beaters approaches closely to a spoon-shaped element 28 which is mounted on or integral with frame 14 and the relationship of the beating elements 24, 24 to the spoon-shaped element 28 is substantially the same as is shown with respect to the corresponding parts in the patent above mentioned. However it is to be understood that in the present case the beating members 24, 24 are flexible and therefore have a tendency to yield upon striking a solid object, for instance hard lumps which are however reduced by continued operation of the beater.

Frame 14 extends laterally as is indicated at 30 and mounts parallel to shaft 18 a rod or the like 32. This rod is rotatively mounted in a relatively elongated slot 34 radially arranged relative to shaft 18 to accommodate slight differences of the center lines between the drivers 10 and 12 of various manufacturers. This rod may be held in position by any convenient means such as washers 36 and snap rings 38, these being located as shown.

It will be seen that with the shaft 18 clutched to the driver 10 and with the rod 32 received in driver 12 but not clutched thereto, the beating elements 24, 24 will be rapidly rotated in close association with respect to spoon-like member 28 but any tendency for the entire apparatus to revolve about the axis of shaft 18 is completely inhibited by reason of rod 32 being received in driver 12. Any tendency for driver 12 to rotate rod 32 is of course accommodated by reason of the mounting of rod 32 and any lateral variation between different makes of motors M is also accounted for by the elongated slot 34.

The driving member 10 is of conventional construction but the drive shaft 18 in addition to being provided with driving ears or the like 40 as is normal is provided with a reduced plain portion 42 for the reception of a clutching sleeve 44. This sleeve may be of plastic, rubber or other elastomeric material and can be thrust over the beveled head 46 which terminates shaft 18 to be located between shoulders 50 and 52 on the shaft. Sleeve 44 is provided with outwardly extending longitudinal ribs 54, 54 at the periphery thereof and interiorly with inwardly extending similar ribs 56. The interior ribs 56 frictionally engage the surface of the reduced portion 42 of shaft 18 while the outwardly extending ribs 54 clutch with the driver 10.

Sleeve 44 can be removed and replaced by one having a different thickness of wall for the purpose of accommodating drivers 10 which may have slightly different diameters. As a practical matter there are only two or three different sizes of such chucks on the market so that when the unit as described is sold, it can be provided with extra driving sleeves to accommodate substantially any make of motor M.

It will be seen that this invention provides for the application of a non-self-contained, power driven beater and spoon combination applicable to the conventional culinary beater motor found in most domestic kitchens, restaurants, etc.

I claim:
1. In combination with an electric motor having a pair of spaced generally parallel driving members, a rotary beater unit including a beater member and shaft for application to one of said driving members and a non-driving rod generally parallel to said shaft for reception in the other driving member, said unit preventing rotation of the beater unit per se while providing for driving of the shaft and beater member.

2. The combination of claim 1 including a sliding support for said rod in a direction toward and from the drive shaft.

3. The combination of claim 1 including a removable drive sleeve for said drive shaft.

4. The combination of claim 1 including a removable drive sleeve for said drive shaft, said sleeve being elastomeric.

5. The combination of claim 1 including a removable drive sleeve for said drive shaft, said sleeve being elastomeric and being provided with exterior means for engagement with respect to said driving member.

6. The combination of claim 1 including a removable drive sleeve for said drive shaft, said sleeve being elastomeric, said sleeve including interior frictionally engaging means with respect to the drive shaft.

References Cited

UNITED STATES PATENTS

| | | | |
|---|---|---|---|
| 1,168,127 | 1/1916 | Szlemko | 416—76 |
| 3,076,638 | 2/1963 | Grise | 259—114 |

FOREIGN PATENTS

| | | | |
|---|---|---|---|
| 958,554 | 9/1949 | France | 416—170(HM) |

MARTIN P. SCHWADRON, Primary Examiner

C. F. SCHIMIKOWSKI, Assistant Examiner

U.S. Cl. X.R.

259—Dig. 29; 416—76